350-96.1 SR

XR 3,610,891

SEARCH ROOM

United States Patent SUBSTITUTE FOR MISSING XR [11] 3,610,891

[72] Inventor André Raciazek
Paris, France
[21] Appl. No. 743,841
[22] Filed July 10, 1968
[45] Patented Oct. 5, 1971
[73] Assignee Compagnie Generale D'Automatisme
Paris, France
[32] Priority July 13, 1967, Dec. 6, 1967
[33] France
[31] 114,397 and 131,244

[54] OPTICAL CODE-READING DEVICES

7 Claims, 6 Drawing Figs.

[52] U.S. Cl. 235/61.11E, 250/219 D
[51] Int. Cl. G01n21/30, G06k 7/10
[50] Field of Search 235/61.11, 61.12, 61.115; 340/146.3, 174.1 A; 250/217, 227; 178/17 D

[56] References Cited

UNITED STATES PATENTS

| | | | |
|---|---|---|---|
| 3,044,696 | 7/1962 | Feissel | 340/146.3 X |
| 3,443,109 | 5/1969 | Broom et al. | 250/217 |
| 2,994,853 | 8/1961 | Astrahan | 340/174.1 A |
| 3,245,002 | 4/1966 | Hall | 250/219 (Q) UX |
| 3,417,231 | 12/1968 | Stites et al. | 235/61.11 (5) |
| 3,502,850 | 3/1970 | Lindquist et al. | 235/61.11 (5) |
| 3,518,440 | 6/1970 | Hanson et al. | 235/61.11 (5) |

OTHER REFERENCES

IBM Technical Disclosure Bulletin, Thorpe, " Optical Scanner," Vol. 4, No. 7, Dec. 1961, pp. 20 & 21.

Sokolski, " Fiber Optic Read Head," IBM Technical Disclosure Bulletin, Vol. 8, No. 6, Nov. 1965.

IBM Technical Disclosure Bulletin, Dryjanski et al., " Optical Reader," Vol. 7, No. 7, Dec. 1964, p. 614 & 615.

*Primary Examiner*—Maynard R. Wilbur
*Assistant Examiner*—Thomas J. Sloyan
*Attorney*—Craig, Antonelli & Hill

ABSTRACT: Apparatus for reading binary-coded information presented as a group of spaced markings on a support having different light-reflecting properties to the markings, has a light source for illuminating two areas of the support spaced in the direction of code reading by a distance equal to a distance between two markings on the support and significant of one binary symbol. The other binary symbol is represented by a larger distance and the apparatus has light-sensitive cells which view respective areas. A logic circuit receives output signals from the cells and detects the presence of a symbol by an output of one cell and the identity of that symbol from the presence or absence of the same output from the other cell.

OPTICAL CODE-READING DEVICES

This invention relates to an optical code-reading device for reading information or messages stored in binary code and depicted as a group of markings, such as lines, spaced from one another on a support.

There are various known codes, which codes are capable of being read by optical means and represented as parallel lines separated by coding distances in accordance with the present invention. For example, there is the well-known binary-coded decimal code, in which the "zero" binary symbol may be depicted as two parallel lines separated by a first gap, while the binary symbol "one" may be depicted as a gap and a single line, the left-hand line having been omitted. The line-gap representations of the binary symbols are placed side-by-side on the support in such a code.

In another system the binary information is so represented that the "zero" binary symbol comprises two consecutive signs separated by a given distance, and the binary symbol "one" is represented by two signs separated by a greater distance. The signs are arranged on a support whose light reflectivity differs from that of the signs. FIG. 1 of the accompanying drawings shows an example of such a code where the signs are represented by parallel lines. In FIG. 1 are shown the numbers 0 to 9 together with line groups representing the decimal numbers 0 to 9. The binary code of each group is shown beneath it, and it will be seen that each number is represented by a group containing the same number of lines but having different spacing between the lines. The length of the line group varies for different members, the numeral 7 being represented by the group of the longest length.

The present invention provides a device for reading information stored in binary code as a group of spaced markings on a support having different light-reflecting properties to the markings which are consecutively spaced from one another in the direction of reading by a gap *a* denoting one binary symbol or a gap *b*, greater than *a*, to denote the second binary symbol, the device comprising: a light source for illuminating the support simultaneously at two areas spaced by a gap *a* in the direction of reading; two photosensitive elements arranged to receive light reflected from the illuminated areas simultaneously; and a logic circuit electrically connected to receive from the elements signals signifying their states of illumination and adapted to provide an output binary symbol each time a particular element attains a predetermined state of illumination, the identity of the binary symbol being determined by whether or not the other element is in the same state of illumination.

Preferably an optical system is provided for collecting light reflected from the illuminated areas and directing it along respective paths leading to the light-sensitive elements, respectively.

If the markings have a light-reflecting nature whereas the support has not, the logic circuit suitably provides an output signifying a binary readout when the particular element is illuminated by the light from the light source being incident upon a reflective marking. Naturally the alternative arrangement could be used where the support is light-reflecting and the marking is not. In this case the predetermined state of illumination of the particular element will correspond to the absence of reflected light from the marking.

The optical system for collecting light reflected from the illuminated areas of the support suitably comprises a pair of light pipes which may be arranged with one pair of ends located near the path of movement of the support relative to the device and at a small distance from the surface of the support. The end faces of the light pipes are suitably spaced by the distance *a* and their other pair of ends are located adjacent respective photosensitive elements which provide the electrical output to the logic circuit.

In an alternative arrangement the optical system for collecting light reflected from the illuminated areas comprises mirrors which are arranged to reflect light from respective areas to respective photosensitive elements.

The invention will now be described in more detail, by way of examples, with reference to the accompanying drawings, in which:

FIG. 1, as mentioned earlier, shows numbers 0 to 9 represented in the form of respective optically readable code groups formed by parallel lines;

Figure 2:
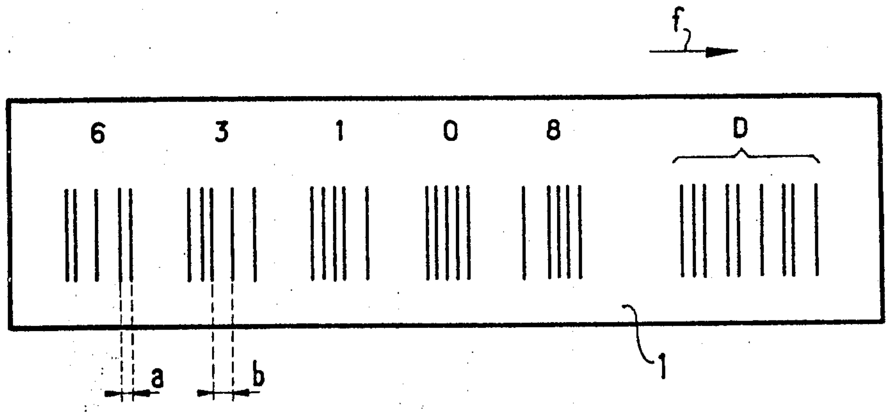
FIG. 2 shows a support carrying coded information and also a starting group.

FIG. 2 shows a rectangular support 1 carrying an identification number, 63108, expressed in conventional form and beneath the individual numbers coded information expressing each number in binary form. In the code used each numeral is depicted by five parallel lines arranged parallel to the narrow side of the rectangular support 1. Other markings than parallel lines may obviously be used if preferred. The binary "zero" symbol of the code is represented by the distance *a* between two parallel lines, and the binary symbol "one" is represented by a space having the width *b* between two consecutive lines, the value of *b* being substantially greater than that of *a*, for example, equal to 2*a*. The lines required for the binary representation of each numeral are placed side-by-side so that they form groups beneath each numeral and the spacing between two groups corresponding to respective numerals is chosen substantially larger than both *a* or *b*.

To facilitate optical readout, the support and the lines have contrasting optical properties in that the lines are totally light-reflecting whereas the support has good light-absorbing properties, for example by being colored mat-black. Obviously the reverse combination of a totally reflecting support and nonreflecting lines could equally well be used as could other techniques for obtaining contrast between the lines and the support.

The support 1 may be used as an identification plate for an object such as a vehicle. For example, the coded information on the plate could relate to the price of the vehicle, the nature of a particular property of it or its registration number. The vehicle could, for example, be a railway truck or carriage, a motorcar, a motor truck or other travelling body.

Figure 1:
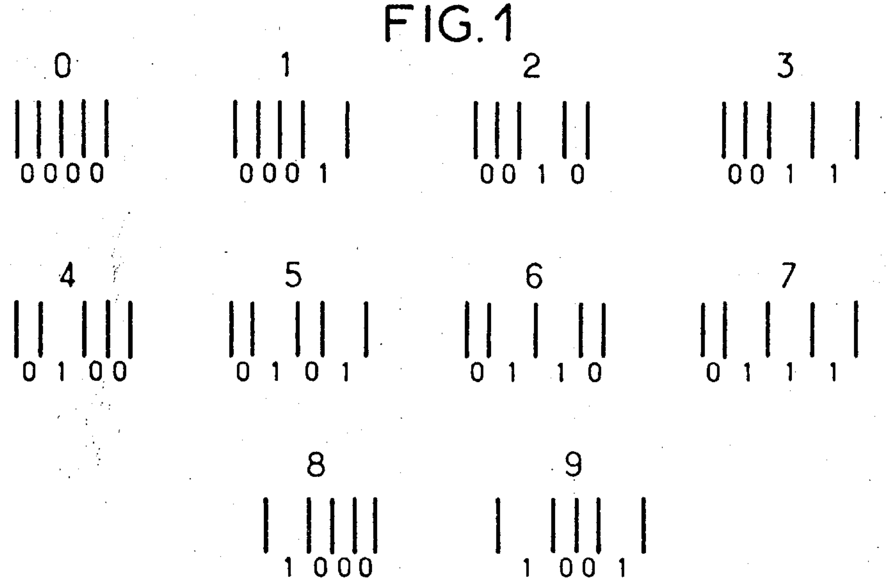
Figure 3:
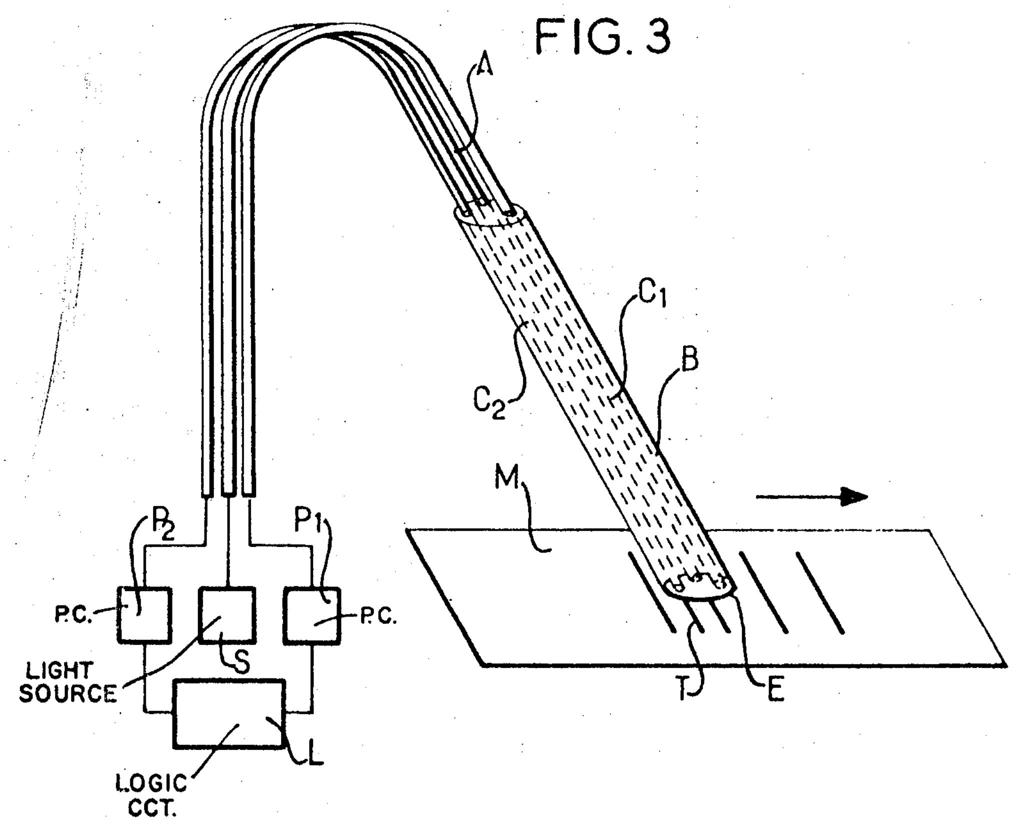
FIG. 3 shows diagrammatically one arrangement of a device for reading the coded information from the support.

FIG. 3 shows the device for reading a coded number from a stationary support bearing the message M. The device is provided with a tubular pencillike casing containing three parallel light pipes $C_1$, $C_2$ and A. The light pipes $C_1$ and $C_2$ scan the message M which is composed of a group of parallel lines having good reflective properties as compared with the support as discussed above. The light pipe A conveys light to the area beneath the end face of the pencil casing adjacent the message from a light source S. The light from the end face of the light pipe A illuminates both areas of the support which are disposed directly beneath the end faces of the light pipes $C_2$ and $C_1$. The casing B serves to maintain the spacing between the end faces of the light pipes $C_1$ and $C_2$ equal to distance *a*.

The light pipes $C_1$ and $C_2$ conduct light reflected from the areas they view to respective photosensitive elements formed by photoelectric cells $P_1$ and $P_2$. The cells $P_1$ and $P_2$ provide electrical output signals significant of the illumination falling on them and which are fed to a logic code-reading circuit L associated with a device which is not shown but which records and may display the code read.

To read the message on the support the pencil casing B is moved across the face of the support in the direction of the arrow F. Slides, not shown in the drawing, associated with the end of the casing B maintain a constant spacing between the surface of the support and the end face E of the casing B. Preferably the light source S provides light which is different from ambient light, for example by being coherent or modulated, so that the electrical outputs of the cells $P_1$, $P_2$ may be arranged to respond only to the light emanating from the source S so that spurious interferences from ambient light is avoided.

As the pencil casing B traverses the message the logic circuit L monitors the electrical output of the cells $P_1$, $P_2$, which may comprise photo diodes, and derives the binary code as it is read from the message. The logic circuit may be arranged to present the number depicted by the binary code of each group to an operator or to a machine which is to be controlled by it.

Figure 4:
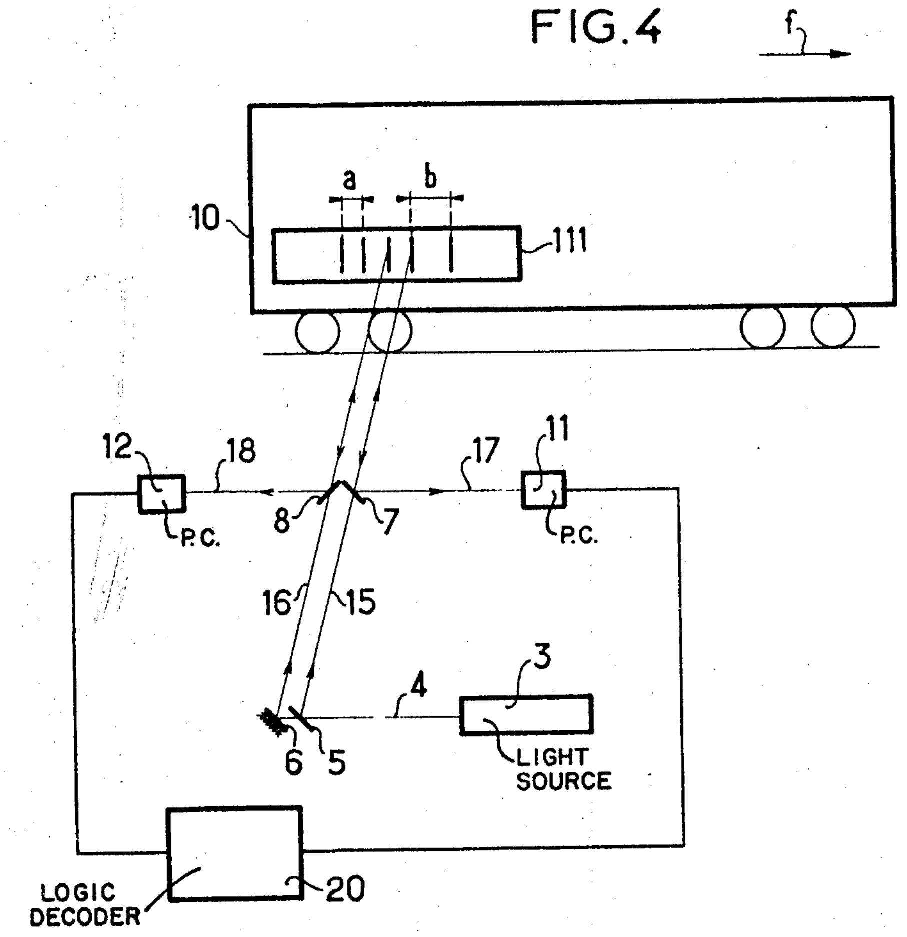
FIG. 4 shows diagrammatically a second form of device for reading the coded information.

FIG. 4 shows a device adapted to read identification information from a support plate provided on one or both sides of a vehicle 10. The vehicle 10 moves in the direction of the arrow *f* and carries on its side at a predetermined height and at a predetermined distance from its ends a code-support plate 111 having the coded identification number of the vehicle formed on it. At opposite ends of the code identification number the support plate is provided with a coded starting group D one of which is shown in FIG. 2. The coded data obtained from reading the starting group has a function which will be explained later.

As shown in FIG. 2 the coded information on the plate is represented as groups of vertical reflecting lines so arranged that the spacing *a* between two consecutive lines of each group corresponds to a binary symbol "zero" while the spacing *b* between consecutive lines corresponds to the binary symbol "one." In order to simplify FIG. 4 the plate 11 is shown as carrying only a few code lines and for the same reason the scale of the distances *a* and *b* has been modified.

The optical code reading device of FIG. 4 comprises a light source 3 emitting a continuous light beam 4 which is incident on a semitransparent mirror 5 inclined to the axis of the light beam and which partially reflects and partially transmits portions of it. The transmitted portion of the light beam strikes a second but totally reflecting mirror 6 which is parallel to mirror 5 so that the two mirrors 5 and 6 provide parallel light beams 15 and 16 directed towards the plate 111. The spacing between the mirrors 5 and 6 is equal to the distance *a*, measured in the direction of the beam 4.

Obviously other beam splitting arrangements may be used to provide a pair of parallel beams from the light emanating from the source 3, one such alternative arrangement could, for example, be a system of optical crystals.

The two light beams 15 and 16 pass through a second pair of semitransparent mirrors 7 and 8 and strike the identification plate 111 at right angles to its plane. As the vehicle 10 moves in the direction *f* in front of the device the identification plate 111 is continuously scanned. The area of each incident beam 15 and 16 on the surface of the plate 111 is smaller than the width of the totally reflecting vertical lines carried by the plate 111. Incident light on the lines is reflected back along its path so that it strikes the reflecting surfaces of the semitransparent mirrors 7 and 8 and is directed in opposite directions by the mirrors along the paths 17 and 18 so that it strikes the photocells 11 and 12 mounted in the paths of the beams 17 and 18. The electrical outputs of the photocells 11 and 12 are connected to the input terminals of a logic decoding circuit 20.

Although it is preferred for the light beams 15 and 16 to strike the surface of the plate 111 at right angles, this is not essential. The beams 15 and 16 may be obliquely incident on the plate 111 and in this case the markings would not be totally reflecting but would deflect the incident beams towards a pair of mirrors suitably spaced and positioned to reflect the incident beams on to a pair of photocells. Such a system avoids the use of semitransparent mirrors so that there is less attenuation of the incident and reflected light.

The optical system for collecting light from the illuminated areas of the plate 111 and transmitting it to the cells 11 and 12 may include other reflecting devices instead of mirrors. Indeed, in some circumstances the optical system may be omitted altogether and the light beams reflected from the plate 111 may be directly incident on the cells 11 and 12.

Preferably the light source 3 supplies coherent light and may, for example, be a laser or a gallium arsenide diode. Coherent light has the advantage that the light beam can be arranged to have a relatively great intensity with negligible interference. In place of coherent light the light source may be arranged to be modulated and the output of the photocells 11 and 12 suitably arranged to eliminate unmodulated electrical signals so that the device responds solely to light from the source 3 and not to ambient light.

As the vehicle of FIG. 4 moves in the direction of the arrow *f*, that is to say from left to right of the drawing, the readout of the binary code is effected from right to left. The device shown in FIG. 4 scans the code starting group before reaching the numerical information. The code starting group information may be recognized from data stored in a memory, not shown, and forming part of the device associated with the logic circuit. A coincidence between the starting group and one of the data groups stored in the memory results in a starting pulse being fed to equipment for recording and processing the information of the starting group so that the decoding of the identification numerical code takes place in a way which takes due account of the direction of the movement of the plate 111 relative to the device.

The code-starting groups prevent the detection of spurious reflections from metal parts of the sidewall of the vehicle being interpreted as coded information. This results from the fact that the code-reading device is held quiescent unless a code-starting group is recognized. The information stored in the code-starting group may, in addition to compensating for the direction of movement of the vehicle, also assist the correct decoding of the coded numerical message flanked by the starting groups.

The code-reading device may be associated with a detector—not shown—which detects the ends of the vehicle or the position of the identification plate 111 on the vehicle 10. The detector switches on the reading device when it senses the presence of a vehicle so that the starting group on the plate 111 can be read shortly afterwards. This has the advantage that the device only scans the plate and the reading of parasitic reflections from other sources is avoided and the device is not switched on for long periods needlessly.

The principle of reading the coded information is the same for both embodiments shown in FIGS. 3 and 4 and it will now be described for the case where the support is light-absorbing and the code lines or markings are reflecting. The readout is effected as follows:

A simultaneous illumination of both photocells 11, 12 (or $P_1$, $P_2$) is interpreted by the logic circuit 20 as a binary "zero" symbol, while the illumination of a particular one of the cells 11 (or $P_1$) only is interpreted as a binary "one" symbol. Obviously when the support is reflecting and the lines are light-absorbing, the illumination states of the cells will be reversed but the interpretation of their outputs is the same. Each decimal identification number, coded in binary four digit code is easily detected from neighboring code groups by the relatively large gaps between the groups, as shown in FIG. 2.

Figure 6:
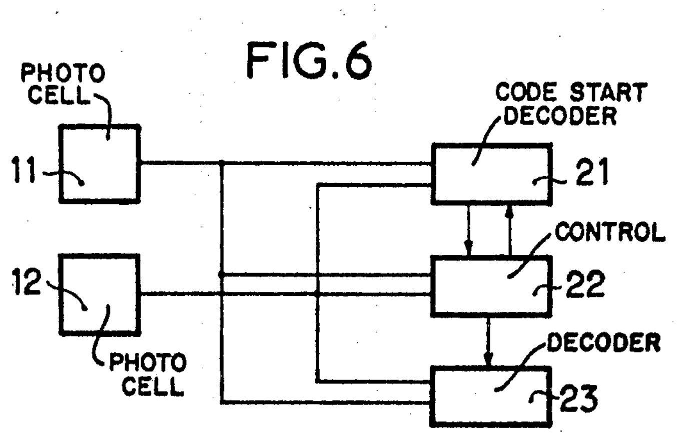

FIG. 6 shows how the electrical signals from the outputs of the photocells 11 and 12 are connected to an input side of a circuit 21 which identifies the code-starting group from data stored in a memory which is not shown.

The logic circuit 20 for identifying the numerical information comprises a control circuit 22 connected to a decoding circuit 23 in which the number identification information is recorded or processed to provide a numerical output. The control circuit 22 and the decoding circuit 23 each have two input terminals which are connected, respectively, to the output terminals of the cells 11 and 12. The circuit 21 for recognizing the code starting group is interconnected with the control circuit 22 for enabling signals to pass in both directions.

The control circuit 22 comprises a counter having a maximum capacity corresponding to the number of digits of the numerical code to be read. The decoding circuit 23 which provides a record of the digits contains an angular shift register controlled by the instantaneous value stored in the counter. The counter 22 is energized by the circuit 21 on the detection and recognition of the first encountered code starting group. The counter subsequently progresses by one unit each time the cell 11 is illuminated, this corresponding to the incident beam 15 on the plate 111 passing through the transition from a nonreflecting surface to a total reflecting surface as it encounters one of the lines on the code group on the plate 111. The information fed from the cells 11 and 12 to the counter 22 is interpreted into binary code as follows:

Photocells 11 and 12 illuminated: binary symbol "zero"

Photocell 11 illuminated and photocell 12 not illuminated: binary symbol "one."

Figure 5:
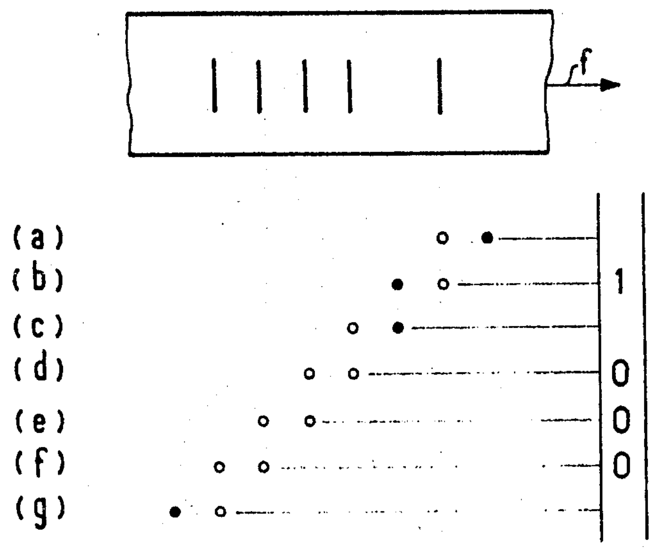
FIG. 5 is an explanatory diagram to assist understanding of the operation of a logic circuit; and, FIG. 6 shows the logic circuit used with the device.

Turning now to FIG. 5 the coded information illustrated by the group of five lines travelling in the direction *f* on a support corresponds to numeral 1 and is represented in binary code as 0001. The lines (*a*) to (*h*) in FIG. 5 indicate the successive states of illumination of the cells 11 and 12 as the support travels past the device shown in FIG. 4.

In line (*a*) of FIG. 5, the cell 11 is not illuminated but the cell 12 is illuminated: the counter therefore remains at "zero" and the shift register shown nothing. In line (*b*), the cell 11 is illuminated but the cell 12 is not illuminated: the counter advances by one unit and the shift register indicates numeral 1. In line (*c*), the cell 11 is not illuminated and the cell 12 is illuminated: the counter does not advance and the register does not indicate. In line (*d*), the cells 11 and 12 are both illuminated: the counter advances by one unit and a "0" is shown in the register; the same happening for line (*e*) and line (*f*).

The counter has now reached its maximum capacity and in the position (*g*) the states of the cells 11 and 12 do not give any additional information and the counter is reset automatically to zero in readiness for decoding, recording and processing of the next code group to be identified.

Because the support 111 moves in the direction *f* relative to the readout device, the binary code is read in the order 1000. The first code starting group detected has, however, so arranged the counter in advance of the binary group being read that the binary information is stored in the register in the order 0001 rather than in the order that it is received.

Should the vehicle be moving in the opposite direction to *f*, the code-starting group at the other end of the coded numerical information will be read first and this prepares the counter of the decoding circuit 22 in such a way that the memory records the binary code 1000 in the order that it is received.

In the example illustrated in FIG. 2, the binary code group numbers are separated from one another. It will be appreciated that the identification information may be continuous and that each group of lines corresponding to a particular number can be detected and interpreted according to a preselected code.

The devices described above offer several advantages.

Variations in the speed of the support relative to the device do not affect the reading in any way and this may in general be effected very rapidly since logic circuits can be made with very short response times. Also, because of the code starting groups, the number identification code can be correctly read and transferred for suitable processing irrespective of the direction of movement of the object carrying the number. Finally, good reliability of the code reading device is easily obtained, and in the arrangement shown in FIG. 3 a simple and easy movement of the pencil casing in front of the stationary support is all that is needed to extract the coded information.

I claim:

1. In a device for reading coded information of a type in which a code group of spaced markings are formed on a support having different light-reflecting properties to the markings which are consecutively spaced from one another in the direction of reading by a gap *a* denoting one binary symbol, or a gap *b*, greater than *a*, denoting the second binary symbol, the device of the invention comprising light source means to illuminate the support simultaneously at two areas spaced by a gap *a* in the direction of reading; first and second photosensitive elements positioned to receive light reflected from respective ones of said two illuminated areas simultaneously and to provide electrical outputs; electrical circuit means connected to receive the electrical outputs from said respective elements; logic circuit means connected to said electrical circuit means to receive said outputs from said elements; and decoding means in said logic circuit means responsive to said element outputs to provide a first output signal each time said first element alone attains a predetermined state of illumination signified by its output and a second output signal when said first and second elements attain said predetermined state of illumination signified by their outputs, storage means for storing the sequentially generated first and second signals, and control means for limiting the number of first and second signals stored by said storage means to the number of code indications in a code group.

2. A device as set forth in claim 1, including an optical system positioned to collect light reflected from said areas and to direct said reflected light along discrete paths to respective elements.

3. A device as set forth in claim 2, in which said optical system includes two light pipes providing one pair of respective ends spaced by the gap *a* the other ends of said light pipes being positioned to direct light transmitted through the pipes onto said photosensitive elements respectively.

4. A device as set forth in claim 3, in which said optical system includes a third light pipe having one end positioned adjacent said one pair of ends of said two light pipes and arranged to illuminate simultaneously the two areas spaced by distance *a*, the other end of said third light pipe being positioned to receive light from said light source means.

5. A device as set forth in claim 1 further comprising additional decoding means connected for actuation of said logic circuit means only in response to detection of a code-starting group on said support from the output signals of said photosensitive elements.

6. A device as set forth in claim 1 further comprising an optical system positioned to collect light reflected from said illuminated areas and to direct said reflected light along discrete paths to said photosensitive elements, respectively.

7. A device as set forth in claim 6, having in said optical system a beam-splitting optical arrangement providing from a light beam emanating from said light source two parallel light beams spaced by said distance *a* and directed to be incident respectively on said areas of said support.